Feb. 5, 1957          C. L. STIDD          2,780,311
RAIL AND FLANGE LUBRICATOR

Filed Jan. 10, 1955          3 Sheets-Sheet 1

INVENTOR.
CHARLES L. STIDD
BY
ATTORNEY

Feb. 5, 1957 C. L. STIDD 2,780,311
RAIL AND FLANGE LUBRICATOR
Filed Jan. 10, 1955 3 Sheets-Sheet 3

INVENTOR.
CHARLES L. STIDD
BY
ATTORNEY

United States Patent Office 2,780,311
Patented Feb. 5, 1957

2,780,311

RAIL AND FLANGE LUBRICATOR

Charles L. Stidd, Portland, Oreg., assignor to Rail Flange Lubricator Co., Portland, Oreg., a corporation of Oregon Application January 10, 1955, Serial No. 480,832

5 Claims. (Cl. 184—3)

This invention relates to the lubrication of wheel flanges of locomotives and the like and the resulting lubrication of the inside faces of the track rails with which the wheel flanges come into contact, and this application is a continuation-in-part of my pending application, Serial No. 302,553, filed under date of August 4, 1952, and entitled "Wheel Flange Lubricator," and subsequently issued as U. S. Patent No. 2,704,137.

It has long been known that such lubrication applied to the wheel flange not only reduces wear on the flange and rails, but also reduces the amount of frictional drag encountered in moving railroad equipment, particularly on curved portions of the track, and thus increases the amount of tonnage movable with the same expenditure of power.

A general object of the present invention is to provide an improved rail and wheel flange lubricator which will be of simple but rigid construction and which will have fewer moving parts than some of the lubricators recently developed for accomplishing this same purpose.

It is customary for such rail flange lubricating devices to be operated by means of a contact wheel which rests on or against the wheel of the locomotive or other railroad vehicle, to the flange of which vehicle wheel the lubricant is applied and from which flange the lubricant is transferred to the track rail. The rotation of such contact wheel by its engagement with the locomotive wheel in turn operates the means by which the lubricant is delivered from the lubricant reservoir in the lubricator to the wheel flange. It has been the practice with recent lubricators of this type to secure the lubricator rigidly to the truck frame of the locomotive on which it is mounted and to have the lubricator contact wheel carried on a hinged arm of the lubricator in order to enable the contact wheel to remain in contact with the locomotive wheel in spite of the vibration of the locomotive, or the up and down movement of the truck frame of the locomotive with respect to the supporting wheel assembly of the locomotive, as the locomotive travels. One of the general faults I have found with such modern lubricators is that the up and down vibration of the locomotive, when traveling at any appreciable speed, results in excessive bouncing of the lubricator contact wheel on the locomotive wheel. In some extreme instances I have noticed that this bouncing even caused the contact wheel to strike against the rigidly mounted portion of the housing of the lubricator and cause serious damage. While the actual engagement of the contact wheel with the lubricator housing could be prevented by increasing the length of a hinge arm on which the contact wheel is mounted in such devices, on the other hand there are disadvantages in increasing the length of this arm and thus increasing the overall size of the lubricator.

An object of the present invention is to provide an improved rail and flange lubricator in which the tendency of the contact wheel to bounce excessively will be retarded. The tendency of the contact wheel to bounce excessively on the locomotive wheel would be lessened if the contact wheel were caused to bear against the locomotive wheel with greater pressure, as, for example, by having a larger proportion of the entire weight of the lubricator carried by the contact wheel. However, increasing the load on the contact wheel would have the objectionable feature of increasing the wear on the contact wheel and its bearings. Another object of this invention accordingly is to provide an improved lubricator of the type indicated which will be so constructed and arranged that not only will the tendency of the contact wheel to bounce be retarded but the actual load on the contact wheel also will be reduced.

Both of the above mentioned objects I have found can be accomplished by having all portions of the lubricator housing rigidly connected together, including the part in which the shaft for the contact wheel is mounted, thus dispensing with any hinged arm for the contact wheel mounting, and by supporting the entire lubricator composite housing on a hinge suspension, so that any up and down movement or bouncing of the contact wheel will be transferred into rocking motion of the entire lubricator on such hinge suspension, the inertia of the mass thus retarding any tendency towards excessive or rapid rocking; and finally by so forming the hinge suspension and so arranging the hinge axis with respect to the center of gravity of the hinged mass that only a desired limited amount of the total weight of the lubricator will actually be carried by the contact wheel.

Since the substitution of a hinge mounting for the entire lubricator presents the problem of providing a suitable hinge connection which in itself will be able to withstand prolonged severe service, an additional specific object of this invention is to provide an improved lubricator which will have a special hinge connection with the locomotive frame, with the hinge connection so arranged, positioned and constructed that it will not be subjected to any excessive wear or strain.

A still further object of the invention is to provide an improved lubricator of the type indicated which will be compact, easily installed, and which will require only a minimum of attention and servicing.

The improvements in my lubricator construction and mounting by which I have been able to achieve these special objects will be described with reference to the accompanying drawings wherein.

Figure 1:
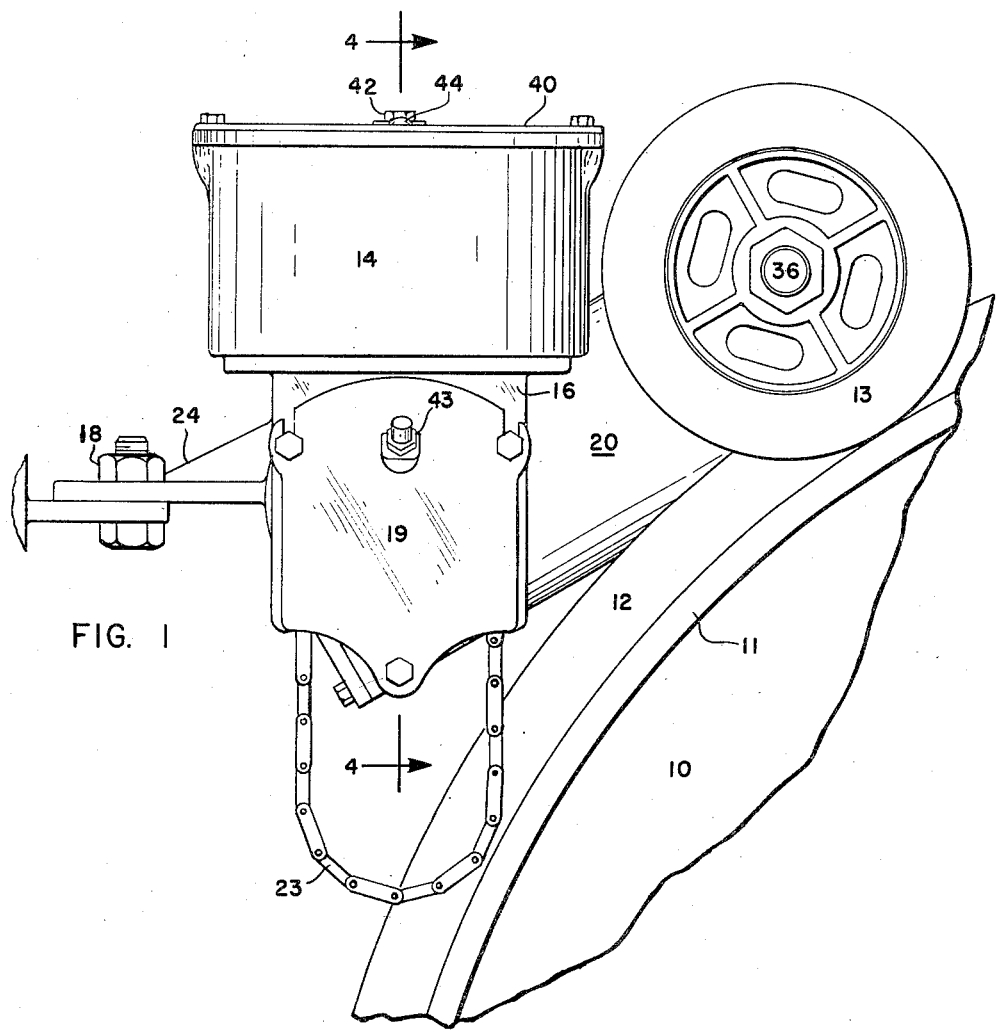
Figure 1 is a front side elevation of my improved lubricator showing the same mounted in position with respect to the flanged wheel of a locomotive or other railroad vehicle.

In Figure 1 a portion of the flanged wheel of a locomotive, or other railroad vehicle, is indicated at 10, the wheel having the customary rim indicated at 11 and the customary flange 12. The application of the lubricant to the wheel flange 12 results in the lubricant then being transferred from the wheel flange to the inside face of the rail on which the wheel travels. Application of the lubricant to the wheel flange takes place through the medium of an endless moving chain 23 which hangs down from the lubricator into contact with the flange 12.

A lubricator contact and drive wheel 13 rides on the rim 11 of the locomotive wheel 10 and thus is rotated by the latter. Rotation of the lubricator drive wheel 13 produces slow movement of the endless lubricator chain 23 through the medium of suitable gear connection.

My improved lubricator has a composite housing which includes an upper chamber portion 14 of cylindrical form which is rigidly secured on a base housing casting 16 providing a lower chamber. The bottom wall 15 (see Figures 4 and 5) of the upper chamber housing portion 14 is bolted or otherwise rigidly secured to a flange 16' extending from the top of the base casting 16. A cover plate 19 extends over the front face of the base casting 16 and completes the housing enclosure for the lower chamber portion formed by the base casting 16. The cover plate 19 is removably secured in place on this base casting by suitable bolts. The bottom wall 15 of the upper housing portion 14 is formed with a restricted opening 17 (Figures 4 and 5), thus providing a passageway between the upper and lower housing chambers.

Figure 2:
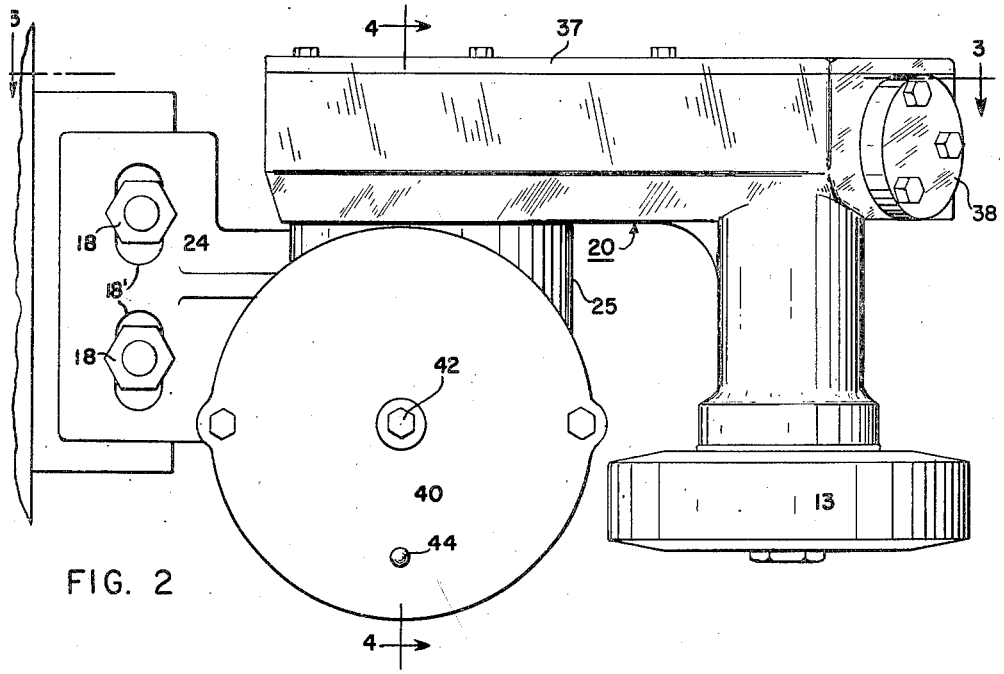
Figure 2 is a corresponding top plan view of the lubricator.
Figure 3:
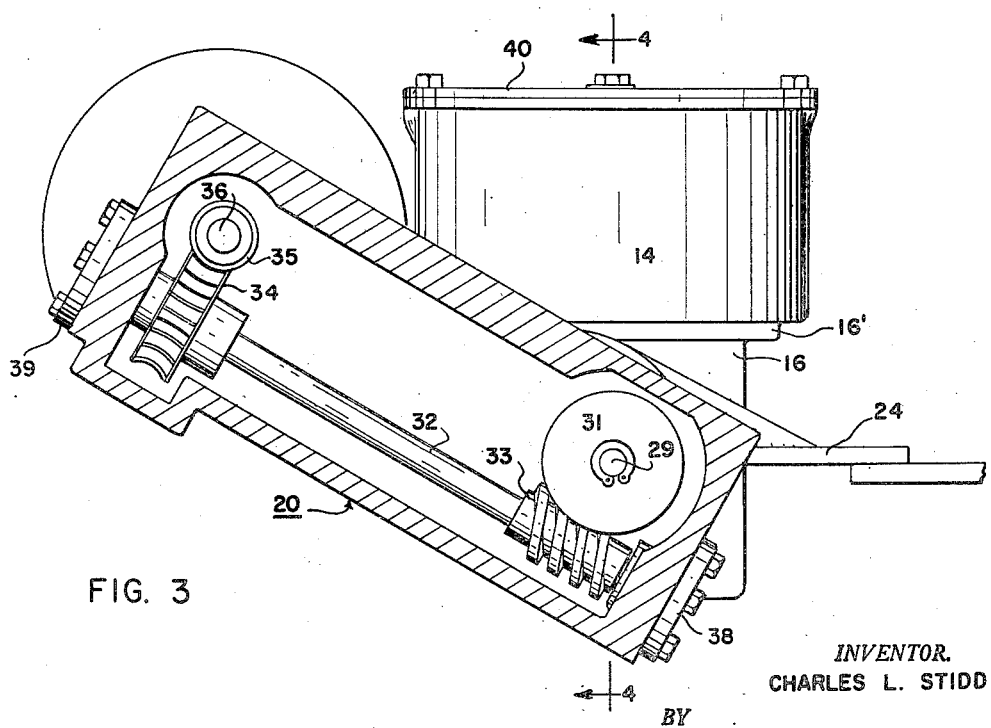
Figure 3 is a sectional side elevation taken on line 3—3 of Figure 2.

A U-shaped housing casting, designated in general by the reference character 20 (shown best in Figure 2), has one end portion 21 (see Figure 4) rigidly secured to the base casting 16 by suitable screws. This end portion of the U-shaped section has an outer cylindrical recessed wall surface on which a bushing 22 is mounted. An arm 24 (Figures 1, 2, 3 and 6), by means of which the entire lubricator is hingedly mounted on the truck of the locomotive or other vehicle, has one end formed with a cylindrical bearing 25 (Figures 4 and 6), the inside diameter of which is the proper size to fit over the cylindrical portion 21 and bushing 22 and thus provide a supporting bearing in which the cylindrical portion 21 is journaled. A groove 26 extends around the inside surface of the bearing 25 and a grease fitting 27 allows lubricant to be supplied to this bearing and bushing. The outer end of the arm 24 is provided with slots 18' (Figure 2) to accommodate bolts 18 (Figure 1) to enable the arm to be properly secured to a supporting plate on the truck frame of the locomotive. This hinge mounting for the lubricator is an important feature of the present invention and further reference will be made to the same later.

A channel extends through the end portion 21 of the U-shaped housing section 20, and registers with an aperture of the same diameter which is centrally positioned in the wall of the base casting 16. A bushing 28 (Figure 4) extends through the channel and aperture and a sprocket wheel shaft 29 is journaled in the bushing 28. A sprocket wheel 30 is attached to the end of the shaft 29 within the lower housing chamber formed by the base casting 16 and cover plate 19.

Figure 6:
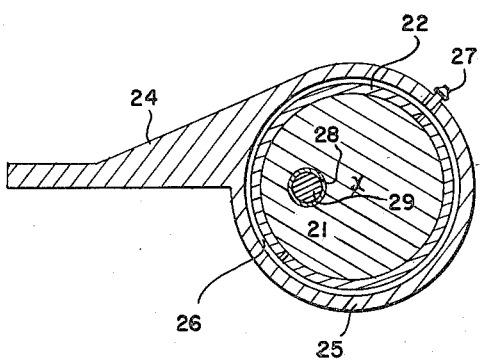
Figure 6 is a section on line 6—6 of Figure 4.

It will be seen from Figure 6 (and also less clearly from Figures 2 and 3), that the cylindrical outer bearing wall surface of the end portion 21 of the U-shaped housing section is eccentric with respect to the inner channel, bushing, and sprocket wheel shaft 29. In other words, the axis of the outer cylindrical surface, which is indicated at X in Figure 6, is spaced substantially horizontally from the shaft 29 and in a direction towards the lubricator contact wheel. The shaft 29, on the other hand, is located in the transverse vertical plane which extends through the center of the base casting 16 and through the center of the upper chamber portion 14 and lubricant reservoir. If it were not for the forward half of the U-shaped housing section 20 and the contact wheel at its outer end, the center of gravity of the lubricator would be substantially in the same transverse vertical plane as the shaft 29 and the center of the base casting 16 and upper portion 14 of the lubricator. Thus it will be apparent that, by having the axis of the cylindrical portion 21 (and thus the axis of the hinge suspension for the entire lubricator) located forwardly from the vertical plane in question, the proportionate amount of the total weight of the lubricator which is carried by the bracket arm 24 is increased and the amount carried by the contact wheel 13 is decreased. In other words, the center of gravity of the entire lubricator is nearer the hinge axis in my improved construction. As a result, although the entire housing of the lubricator is rigidly connected together and the housing is pivotally carried on its hinge suspension, less weight is actually imposed on the contact wheel. At the same time any up and down movement of the lubricator contact wheel with respect to the lubricator supporting arm 24 will cause the entire lubricator to rock up and down, and the inertia of the entire mass will prevent rapid or excessive rocking and thus restrain any bouncing tendency of the contact wheel. These are important features of my improved lubricator.

Figure 7:
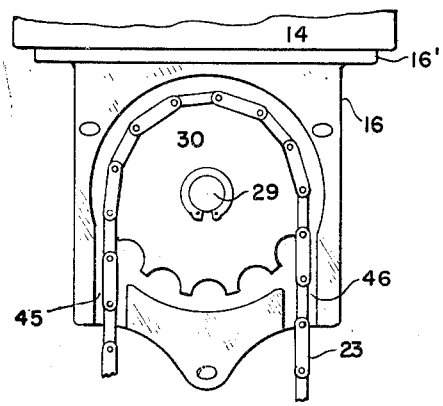
Figure 7 is a fragmentary elevation of the lower chamber portion of the composite housing of the lubricator, with the front cover plate for this portion removed and the elevational view then being taken from the line 7—7 of Figure 4.

The lubricant-carrying chain 23 is a sprocket or block chain which passes around and is supported by the sprocket wheel 30 and which meshes with teeth on the sprocket wheel. The base casting 16 and cover plate 19 are formed so as to provide a pair of openings 45 and 46 (Figure 7) in the bottom of the lower chamber for the chain 23. Rotation of the sprocket wheel 30 and the resulting movement of the chain 23 into and out of the chamber in the lower casting 16, when the lower chamber is filled with lubricant, causes the lubricant grease to be carried by the chain and deposited on the locomotive wheel flange, as previously indicated.

A worm gear 31 (Figures 3 and 4) is secured on the other or inner end of sprocket wheel shaft 29. A shaft 32, the ends of which are journaled in suitable bearings (not shown) in the center portion of the U-shaped housing section 20, carries a worm 33 which meshes with worm gear 31. The other end of shaft 32 carries a worm gear 34. A worm 35, on the inner end of a shaft 36, meshes with worm gear 34. The lubricator contact and drive wheel 13 is secured on the end of this shaft 36 beyond the corresponding end of the U-shaped housing section 20. Thus rotation of the contact wheel 13 causes rotation, but at greatly reduced speed, of the sprocket wheel 30 as desired. The U-shaped housing section 20 is provided with a removable side plate 37 (Figure 2) and with suitable end plates 38 and 39 with bearing gaskets (not shown) to provide convenient access to the various portions of the interior of the housing section 20 and access to the gear members carried therein.

A cover plate 40 is bolted or otherwise removably secured in place on top of the upper housing portion 14 and seals the top of the upper chamber of the lubricator. A disc weight 41 (Figure 4), the diameter of which is only slightly less than the inside diameter of the chamber in the housing portion 14, is slidably mounted on a guide and lift rod 42. The lift rod 42 extends through a center aperture in the cover plate 40 and is slidable in the cover plate. A grease fitting 43 in the cover plate 19 for the lower chamber enables lubricating grease to be forcibly delivered into the lower chamber and thence into the upper chamber until both chambers of the lubricator are filled. The disc weight 41, which will rest on top of the grease in the upper chamber, will be raised as the lubricator is being stocked with grease, and as the disc 41 approaches the top of the upper chamber it will contact a grease gauge pin 44 (Figure 4) which is slidably mounted in the top cover plate 40, and the pushing of this gauge pin into fully raised position by the disc 41 will indicate that both lower and upper chambers of the indicator have been filled with the grease lubricant.

Figure 4:
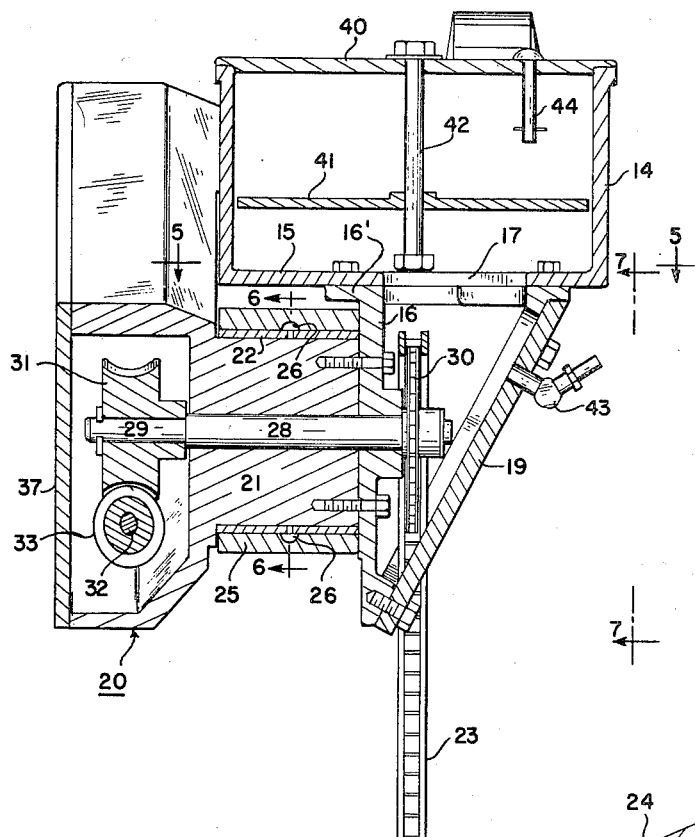
Figure 4 is a transverse sectional elevation taken on line 4—4 of Figures 1, 2 and 3.
Figure 5:
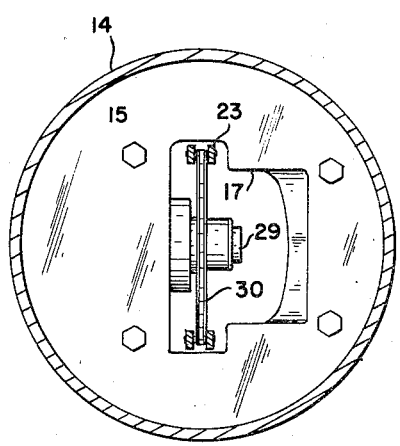
Figure 5 is a fragmentary plan section on line 5—5 of Figure 4.

Due to the semi-solid condition of the lubricant grease employed for wheel flange and rail lubrication, it is generally desirable to provide some means for preventing the possible forming of a path or grease tunnel for the chain through the grease in the lower chamber. The development of such a grease tunnel would, of course, cause the chain to fail to carry the desired amount of grease to the wheel flange. Such possibility, however, is prevented by the disc weight 41 acting in combination with the vibration and rocking to which the entire lubricator is subjected when the locomotive is in motion. The fact that the lower chamber formed by the casting 16 and cover plate 19 decreases in size from top to bottom, as shown in Figure 4, also aids in preventing the forming of a grease tunnel by the chain and aids in the compacting of the grease in the bottom of the lower chamber where the chain leaves the housing in its travel to the wheel flange.

There are additional important advantages in the particular arrangement and positioning of the hinge connection which I have provided for the mounting of my lubricator on the locomotive. Since the portion 21 of the housing section 20, together with the bushing 22, will constitute the hinge pintle for the hinge assembly, the relatively large diameter of such hinge pintle results in greater strength and stability, in less actual hinge wear than would be the case with a smaller hinge pintle. Also, as may be observed from Figures 2 and 4, the lubricator is in substantial balance laterally on the hinge assembly when it is in operation with the contact wheel 13 riding on the locomotive wheel. As a result torsional strain on the hinge assembly, and specifically on the mounting arm 24 and the bracket on the locomotive frame to which the arm 24 is secured, is reduced to a minimum. The advantages of this are obvious.

Since the position of the contact wheel 13 with respect to the composite housing of the lubricator, and particularly with respect to the upper housing portion 14, is fixed, the contact wheel can safely be located in close proximity to this housing portion 14 without any danger of coming into contact with the housing. An additional advantage is that this enables the entire lubricator to be kept compact and to occupy a minimum amount of space when installed in position.

I claim:

1. A rail and wheel flange lubricator including a composite rigid housing, an upper chamber portion in said housing, a lower chamber portion connected to said upper chamber portion, a lubricant passageway between said upper and lower chambers, a driven sprocket wheel located in said lower chamber, an endless chain applicator riding over said sprocket wheel and extending down through openings through the bottom of said lower chamber, the size of said lower chamber decreasing from top to bottom, means for delivering lubricant into said chambers and means for maintaining said lubricant under pressure, a U-shaped housing section in said composite rigid housing rigidly connected at one end to said lower chamber portion, said connected end of said U-shaped housing section formed with a cylindrical surface arranged on a horizontal axis, a mounting arm for said lubricator, said arm forming a cylindrical bearing extending around said cylindrical surface of said end of said U-shaped housing section, whereby said cylindrical end is journaled in said mounting arm enabling said composite housing to rock on said mounting arm, an operating contact wheel mounted at the opposite end of said U-shaped housing section, and gearing connecting said contact wheel with said sprocket wheel, said contact wheel riding on the wheel of the vehicle on which the lubricator is used, the axis of said contact wheel and the axis of said journaled portion of said U-shaped housing section being parallel, whereby said composite housing will be partly supported by said contact wheel as the latter rides on the vehicle wheel and be free to rock with the relative up and down movement of the contact wheel with the vehicle wheel but will restrain any tendency of the contact wheel to bounce excessively, the axis of said journaled portion of said U-shaped housing section being much closer to the center of gravity of the lubricator than the axis of said contact wheel and thereby preventing excessive weight being carried by said contact wheel.

2. In a rail and wheel flange lubricator, a composite rigid housing, an upper chamber portion in said housing, a lower chamber portion connected to said upper chamber portion, a lubricant passageway between said upper and lower chambers, a sprocket wheel located in said lower chamber, an endless chain applicator riding over said sprocket wheel and extending down through openings through the bottom of said lower chamber, means for delivering lubricant into said chambers, a U-shaped housing section in said composite rigid housing rigidly connected at one end to said lower chamber portion, said connected end of said U-shaped housing section formed with a cylindrical surface arranged on a horizontal axis, a mounting arm for said lubricator, said arm forming a cylindrical bearing extending around said cylindrical surface of said end of said U-shaped housing section, whereby said cylindrical end is journaled in said mounting arm enabling said lubricator to rock in a vertical plane on said mounting arm, an operating contact wheel mounted at the opposite end of said U-shaped housing section, the axis of said contact wheel and the axis of said journaled portion of said U-shaped housing section being parallel, and means connecting said contact wheel with said sprocket wheel, said contact wheel riding on the wheel of the vehicle on which the lubricator is used, whereby said lubricator will be partly supported by said contact wheel as the latter rides on the vehicle wheel and be free to rock with the relative up and down movement of the contact wheel with the vehicle wheel but will restrain any tendency of the contact wheel to bounce excessively, the axis of said journaled portion of said U-shaped housing section being much closer to the center of gravity of said lubricator than the axis of said contact wheel and thereby preventing excessive weight being carried on said contact wheel, and said journaled portion of said U-shaped housing section also being so positioned that said lubricator will be substantially in lateral balance with respect to said mounting arm when said contact wheel rides on the vehicle wheel.

3. In a rail and wheel flange lubricator, a composite rigid housing, an upper chamber portion in said housing, a lower chamber portion connected to said upper chamber portion, a lubricant passageway between said upper and lower chambers, a sprocket wheel located in said lower chamber, an endless chain applicator riding over said sprocket wheel and extending down through openings through the bottom of said lower chamber, said composite housing having a portion near one end formed with a cylindrical surface arranged on a horizontal axis, a mounting arm for said lubricator, said arm forming a cylindrical bearing extending around said horizontal cylindrical surface portion of said composite housing, an operating contact wheel mounted at the opposite end of said composite housing, the axis of said contact wheel and the axis of said cylindrical surface portion being parallel, and means connecting said contact wheel with said sprocket wheel, said contact wheel riding on the wheel of the vehicle on which the lubricator is used, whereby said lubricator will be partly supported by said contact wheel as the latter rides on the vehicle wheel and be free to rock with the relative up and down movement of the contact wheel with the vehicle wheel but will restrain any tendency of the contact wheel to bounce excessively, the axis of said horizontal cylindrical surface portion of said composite housing being positioned much closer to the center of gravity of the lubricator than the axis of said contact wheel and thereby preventing excessive weight being carried by said contact wheel.

4. In a rail and wheel flange lubricator, a rigid housing, a sprocket wheel located in one end of said housing, a lubricant chamber in said end of said housing, an endless chain applicator riding over said sprocket wheel and extending down below said housing, an operating contact wheel carried at the opposite end of said housing, the axes of said sprocket wheel and said contact wheel being parallel, said contact wheel adapted to ride on a vehicle wheel and said chain applicator adapted to contact the flange of said vehicle wheel when said lubricator is mounted on the vehicle, means in said housing connecting said contact wheel with said sprocket wheel, and means for supporting said housing on the vehicle, said housing mounted in said supporting means for rocking on an axis substantially parallel to the axes of said sprocket wheel and said contact wheel.

5. The combination set forth in claim 4 with said rocking axis for said housing positioned between the axis of said sprocket wheel and the axis of said contact wheel.

References Cited in the file of this patent
FOREIGN PATENTS

| | | |
|---|---|---|
| 906,260 | France | May 14, 1945 |
| 535,969 | Germany | Oct. 17, 1931 |
| 108,402 | Switzerland | Jan. 16, 1925 |